United States Patent
Capriotti et al.

(10) Patent No.: US 6,803,111 B2
(45) Date of Patent: Oct. 12, 2004

(54) GLAZING WITH A MEMBER BONDED THERETO

(75) Inventors: Luigi Capriotti, S. Benedetto del Tronto (IT); Salvatore Colicino, Turin (IT); Ciro Paudice, Vasto (IT); Michel Brémont, Attenschwiller (FR); Pascal Camus, St. Pierre de Commiers (FR); Mathias Hänsel, Rümmingen (DE); Philippe Jeantet, Saint-Louis (FR); Frédéric Laure, Bures sur Yvette (FR)

(73) Assignees: Societa Italiana Vetro-Siv-S.p.A., San Salvo (IT); A. Raybond S.A.R.L., Saint-Louis (FR)

(*) Notice: Subject to any disclaimer, the term of this patent is extended or adjusted under 35 U.S.C. 154(b) by 4 days.

(21) Appl. No.: 10/156,837

(22) Filed: May 30, 2002

(65) Prior Publication Data

US 2003/0017314 A1 Jan. 23, 2003

(30) Foreign Application Priority Data

Jun. 1, 2001 (EP) ............................................. 01830359

(51) Int. Cl.⁷ ............................... B32B 7/12; B60J 3/00
(52) U.S. Cl. ....................... 428/426; 428/195; 428/198; 428/200; 428/201; 428/203; 428/210; 428/220; 428/431; 428/480; 156/290; 156/291; 296/97.7
(58) Field of Search ................................ 428/195, 198, 428/200, 201, 203, 210, 220, 430, 431, 480; 156/290, 291; 248/535, 205.3, 237; 296/97.9

(56) References Cited

U.S. PATENT DOCUMENTS

| | | |
|---|---|---|
| 4,715,647 A | 12/1987 | Mynott et al. |
| 4,888,072 A | 12/1989 | Ohlenforst et al. |
| 5,667,896 A * | 9/1997 | Carter et al. ............. 428/425.6 |
| 6,348,118 B1 | 2/2002 | Johnson et al. |
| 2003/0110702 A1 * | 6/2003 | Capriotti et al. .............. 49/375 |

FOREIGN PATENT DOCUMENTS

| | | |
|---|---|---|
| DE | 43 18 909 A1 | 12/1994 |
| EP | 0 368 728 A2 | 5/1990 |
| EP | 0 532 384 A1 | 3/1993 |
| EP | 0 834 414 A2 | 4/1998 |
| FR | 2 738 194 A3 | 3/1997 |

* cited by examiner

Primary Examiner—Deborah Jones
Assistant Examiner—G. Blackwell-Rudasill
(74) Attorney, Agent, or Firm—Burns, Doane, Swecker & Mathis, L.L.P.

(57) ABSTRACT

A glazing is provided comprising a glass sheet with a rigid member bonded to it by adhesive which is provided on at least two discrete areas of the member or glass sheet. The adhesive may be a structural adhesive, pre-applied in tablet form, and activated by heat. The use of multiple discrete areas of adhesive allows differential thermal expansion to be accommodated. The glazing may be for a vehicle window, and the rigid member may be a plate, especially a mounting plate for ancillary equipment.

15 Claims, 2 Drawing Sheets

GLAZING WITH A MEMBER BONDED THERETO

BACKGROUND OF THE INVENTION

1. Field of the Invention

The present invention relates to a glazing comprising a sheet of glass with a member bonded to it by adhesive. More particularly the glazing may be for a vehicle window, and the member may be a plate, especially a mounting plate for an accessory or a piece of equipment which is ancillary to the window, e.g. a wiper assembly, lock or catch, or a support strut for an opening window.

2. Description of the Related Art

There has been a continuing increase over the years in the amount of equipment provided on vehicles, especially cars. Moreover, vehicle manufacturers have developed a preference for vehicle components to be supplied as major assemblies, incorporating several smaller components, as this facilitates assembly of the vehicle on the production line. Consequently, there is an increasing need for accessories or auxiliary equipment to be attached to glass sheets (normally bent glass sheets which are either toughened or laminated), and there is also a consequent need for provision for such attachment to be included as part of the glazing as supplied to the vehicle manufacturer.

It is known from EP 368 728 to bond a plate to a sheet of glass with adhesive, wherein the entire surface of the plate is coated with adhesive, and holes are provided in the glass to increase the surface area of glass covered by adhesive, and to provide a mechanical key for the adhesive. However, the drilling of holes in glass is both time consuming and expensive; it requires extra equipment to be provided in the glass processing line to perform the drilling, reduces production rates, and the holes weaken the glass. For these reasons it is generally desirable to minimise the number of holes that need to be drilled in a glazing, and indeed it is preferable to avoid the need for holes altogether.

It is of course possible to bond items to the surface of a glass sheet without the attendant provision of one or more holes, but there are strict limits on the size of the item that may be thus bonded, and the weight or applied force which the adhesive bond can withstand. When it is desired to bond a larger item to glass, or to accommodate a larger weight or force, it is not satisfactory simply to increase the area over which adhesive is applied, for a variety of problems may be encountered.

For instance, when a structural adhesive is employed, i.e. a rigid, non-elastic, adhesive, it is found that as the area of adhesive increases in size, there is an increased tendency for the glass to break, or for damage to occur to the plate being bonded. This results from the differing coefficients of thermal expansion of glass and the material of which the plate is composed, which results in the generation of stresses when the glazing is subjected to variations in temperature. While elastic adhesives are able to accommodate a certain degree of differential thermal expansion owing to their flexibility, the very fact that they flex means that they are not suitable for applications where there is a tight tolerance on the positioning of the item to be bonded, or where the item is to be mounted in a rigid and immobile fashion.

EP 532 384 discloses an arrangement for mounting a wiper on an automotive window, which is susceptible to the problems outlined above. A support plate is bonded to the window with a layer of adhesive, and a driving mechanism is attached to the plate by fixings such as bolts or screws. The adhesive may be an epoxy resin, i.e. a structural adhesive.

It would be desirable to alleviate the problems associated with structural adhesives so as to be able to exploit their greater potential bond strength, and greater suitability for applications requiring a high degree of accuracy and positional certainty.

SUMMARY OF THE INVENTION

It has been unexpectedly found that the provision of multiple areas of adhesion, instead of one relatively large area, reduces the likelihood of breakage of the glass linked to the presence of the item bonded to the glass, and yields better overall performance.

According to the present invention there is provided a glazing comprising a glass sheet with a rigid member bonded to it by adhesive, wherein the adhesive is provided on at least two discrete areas of the member or glass sheet.

Preferably, the adhesive is a structural adhesive, i.e. one that is rigid, inelastic and non-deformable when set. Structural adhesives are capable of bearing loads of great magnitude, which may be greater than the weight of the bonded parts.

Generally, the material of which the rigid member is composed (normally metal) has a different coefficient of thermal expansion from the glass to which it is bonded. The member may be formed from a single element such as a single piece of metal, or it may comprise a number of elements which are united so as to behave as a single rigid element, i.e. the member is unitary in nature, even when made from a plurality of components.

It is also preferable for the areas of adhesive to be selected such that they are on opposite sides of the overall centre of gravity of the member together with any item attached to the member. The moment of force which the weight of the member and any attached item exerts on the adhesion points is thereby minimised. Preferably the adhesive is the sole means of attaching the rigid member to the glazing, i.e. it is not supplemented by mechanical fixings.

The invention also provides a method of bonding a rigid member to a glazing by adhesive, the glazing comprising a glass sheet, wherein the method includes the steps of:

a) applying adhesive to at least two discrete areas of the member or glass sheet, b) positioning the member relative to the glass sheet, c) pressing the member and glass sheet together so that the adhesive is in intimate contact with both member and glass sheet.

BRIEF DESCRIPTION OF THE DRAWINGS

The invention will now be further described by way of the following specific embodiments, which are given by way of illustration and not of limitation, with reference to the accompanying drawings in which.

DETAILED DESCRIPTION OF THE PREFERRED EMBODIMENTS

Figure 1:
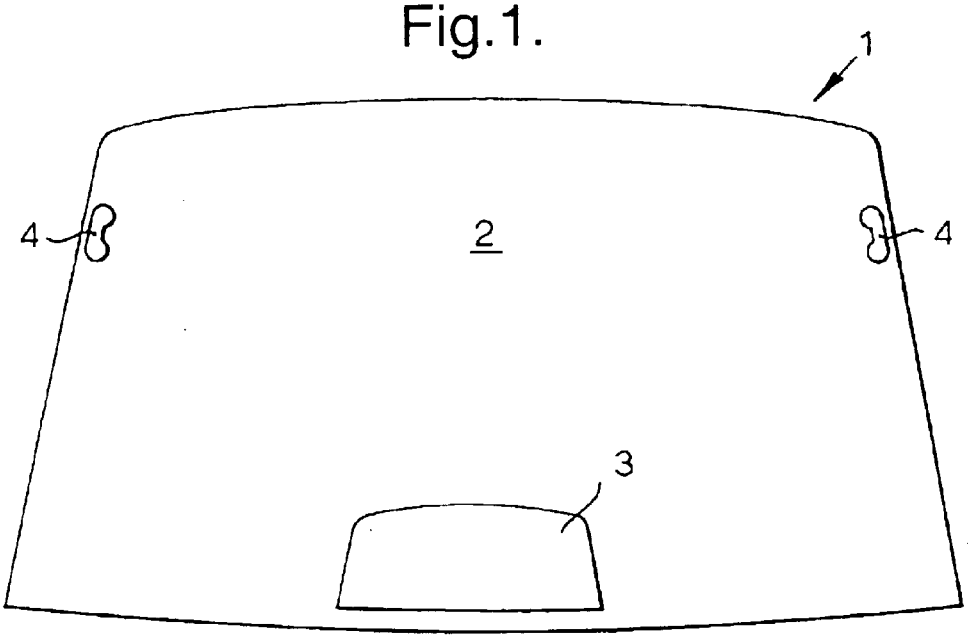
FIG. 1 shows a glazing bearing two types of rigid member which are bonded in accordance with the invention.

FIG. 1 shows a glazing 1 comprising a glass sheet 2 with rigid members 3, 4 bonded to it. Each member has at least one surface which corresponds in shape substantially to the shape of the glass sheet over the area of the bond. In most cases, the glass sheet is of moderate curvature, and so the member has one flat, or approximately flat face. In the embodiments illustrated, each member is in the form of a generally flat plate. Preferably the plate is composed of metal, e.g. mild steel with a suitable anti-corrosive surface treatment, such as the application of paint, powder coating or a plating.

Figure 2:
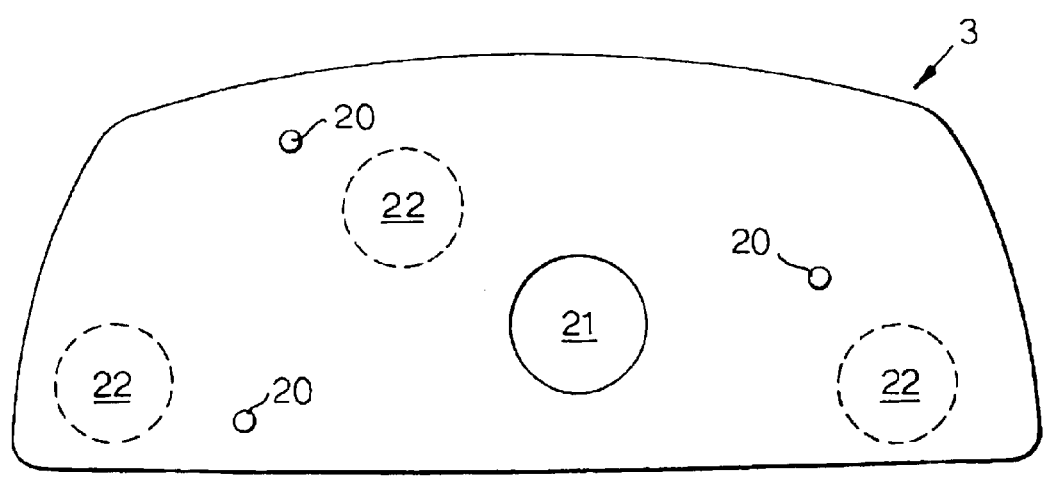
FIG. 2 is a view in the same direction as FIG. 1, showing one of the members of FIG. 1 greatly enlarged.

FIG. 2 shows a plate 3 greatly enlarged. It is in fact a mounting plate for a complete wiper assembly, i.e. including wiper drive motor and any gearbox required. The plate includes threaded studs 20 for mounting the wiper assembly, and a hole 21 through which the wiper spindle protrudes (a corresponding hole is positioned in the glass sheet). The three circles represented by dashes indicate discrete areas 22 to which adhesive is applied to bond the plate 3 to the glass sheet 2. When the wiper assembly is attached to the plate, the motor (the heaviest component) is positioned towards the left-hand end as viewed in FIG. 2. Consequently, two studs 20 and two adhesive attachment points 22 are provided towards the left-hand end of the plate. The two left-hand adhesion points are positioned on opposite sides of the overall, or net, centre of gravity of the plate and wiper assembly taken together, thereby reducing the moments of force exerted on the adhesion points, i.e. the mechanical demands placed on the adhesive are less. It should be noted in this connection that the plate measures approximately 350 mm by 120 mm, and the wiper assembly may weigh of the order of 1500 g. As will be explained in more detail below, it is preferred to use a final adhesive thickness of 0.2 mm, and circles 22 in fact represent recesses in the plate which are adapted to receive the adhesive.

Figure 3:
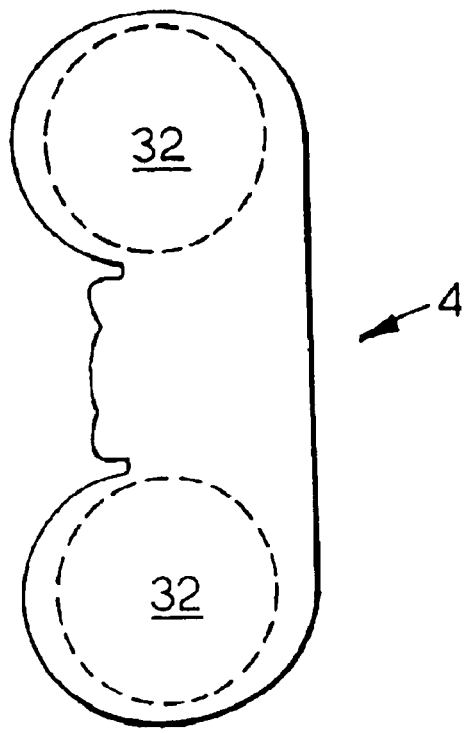
FIG. 3 is also a view in the same direction as FIG. 1, showing the second type of member greatly enlarged.
Figure 4:
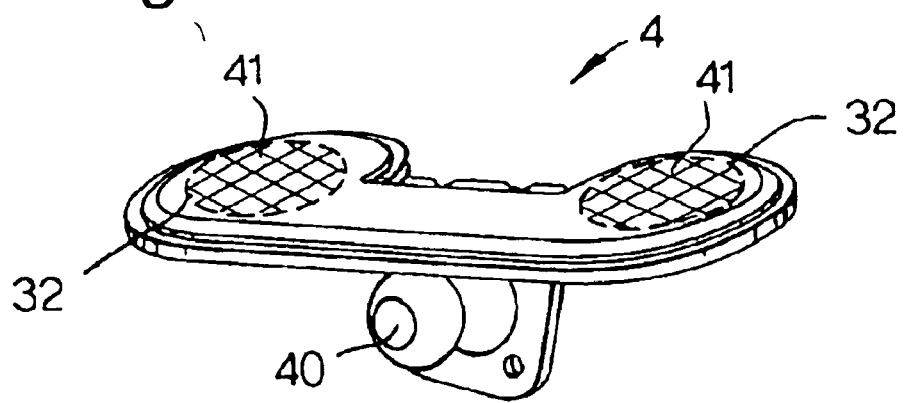
FIG. 4 is a perspective view of the member of FIG. 3.

FIG. 3 shows a second embodiment of rigid member, designated 4, which again is in essence a mounting plate. The plate 4 is shown in perspective view in FIG. 4. Glazing 1 is in fact an opening rear window for a vehicle, being pivotally mounted by means of hinges (not shown) provided on its upper edge, and plates 4 are mounting points for telescopic gas-filled support struts, which hold the window in the open position. Each support strut is attached to a ball-joint 40 attached to a plate, the ball-joint being shown in FIG. 4. FIG. 3 shows the base of the plate, i.e. the opposite side to the ball-joint, and this includes two areas 32 to which adhesive is applied. The adhesive itself is shown in FIG. 4, and is designated 41. Plate 4 measures 80 mm by 40 mm. While it is preferable to bond items of equipment to a glass sheet by means of a mounting plate, it is possible to bond the item directly to the glass, if suitable areas for adhesive can be provided directly on the item.

The present invention is most relevant to structural adhesives. Preferably, the adhesive is pre-applied to the plates, i.e. it is applied to them at an earlier time or date, possibly in a different location. Solid adhesive may be pre-shaped to suit the plate before application, e.g. it may be applied in the form of tablets, which are received in the recesses 22, 32. Most conveniently, the plates are bought from a supplier with tablets of a tack-free adhesive pre-applied; a suitable supplier is A. Raybond SARL of 68300 Saint-Louis, France.

The term "tack-free" refers to a solid adhesive which is not sticky to the touch, thereby facilitating handling. Such adhesives only become sticky after activation, and this term refers to any process which makes a tack-free adhesive sticky, initiating the bonding process. Activation also refers to the initiation of curing in a previously inert adhesive; it may involve melting the adhesive (at least on its surface), initiating a heat-dependent chemical reaction, or removing or destroying a barrier which separates two reactants. Activation may be carried out just before, or after, the positioning of the plates on the glass sheet.

A preferred adhesive for the present application is a polyester/isocyanate-based composition such as TECH-BOND PUR from A. Raybond SARL, a tack-free structural adhesive. In this type of composition, the polyol and isocyanate reactants are pre-mixed in stoichiometric ratio, but the isocyanate is "end capped" or micro-encapsulated to prevent contact with the polyol. Application of heat activates the adhesive by destroying, e.g. melting, the capping or encapsulating membrane and allowing the isocyanate component into contact with the surrounding polyol so that the curing reaction starts. This adhesive does not require a primer, and it contains small inert incompressible beads, e.g. composed of glass, for reasons explained below.

With this type of adhesive, initial bond strength sufficient to hold the plate in position is rapidly developed as the adhesive cools, e.g. in less than 1 minute. Depending on the composition, full strength is developed within a curing time of 30 minutes, 1 hour, 2 hours or 3 to 5 hours, but this can occur while the glazings are in transit to the vehicle manufacturer's premises.

The term "curing time" is to be understood in a practical sense; while theoretically polymerisation of such adhesives may be slow in its final stages such that the adhesive may never attain 100% polymerisation, for practical purposes a full cure is attained relatively quickly, as indicated above. The practical consideration is whether the bond has reached a sufficient percentage of full strength to allow the item (wiper motor, etc) to be mounted on the plate.

As mentioned above, the preferred adhesive is available in tablet form. Tablets of 24 mm diameter (designated "No.2") are recommended for the ball-joint plate 4, and tablets of 35 mm diameter ("No. 3") are recommended for the wiper plate 3. It is preferable for the areas of adhesion 22, 32 to be separated by a distance comparable to, preferably at least equal to, the diameter of the tablets.

The procedure by which bonding is carried out is as follows. First the glass is cleaned in the usual way, e.g. with isopropyl alcohol, BETASEAL VP-04604 which is a cleaning agent or other suitable cleaning agent. As bonding is carried out at an elevated temperature, the glass is then pre-heated to approximately 80° C. to avoid thermal shock.

For rapid production with minimised cycle time, bonding is preferably carried out in a dedicated robotic cell, the robot carrying a heated pressing head which positions the plate accurately relative to the glass, and presses them together so that the adhesive is in intimate contact with both the plate and the glass sheet. It is desirable to achieve a temperature in the range 140° C.–160° C. at the glass-adhesive interface, and to achieve this as rapidly as possible. Consequently, the pressing head may be maintained at a temperature in the range 180° C.–270° C. depending on the thermal mass of the plate, and the maximum temperature which it (including any surface coating, e.g. paint) can withstand. Naturally, the hotter the pressing head, the quicker the plate will heat up.

The pressing head is kept in contact with the plate for a few seconds, for example 2–5 seconds, and then retracted. The adhesive tablets supplied by A Raybond are initially 2 mm thick, and the adhesive is pressed until it has reduced in thickness to 0.2 mm. By providing incompressible beads of 0.2 mm diameter in the adhesive, they act as an "end-stop" for the pressing step, ensuring that the desired final adhesive thickness is attained every time. Bond strength increases rapidly, and 50–80% of final strength may be achieved within one minute. The glass sheet is removed from the cell and allowed to cool, giving a cycle time of the order of a few minutes. As mentioned before, full bond strength may be achieved within 1, 2 or 4 hours, depending on the conditions. This is substantially faster than other adhesives which are otherwise suitable for this application, as they may require 2 or 3 days to cure fully.

Clearly, the coefficients of thermal expansion of glass and metal are different. Given that the metal plate may have a maximum dimension of at least 70 mm, possibly at least 100 mm or even 150 mm, a marked difference in linear contraction will occur between the plate and the portion of the glass sheet to which it is bonded. Furthermore, as the glazing is subjected to variations in temperature in service, the differential may increase or decrease. Whereas a glass sheet may be liable to break when a plate is continuously bonded to the glass along the majority of the length of the plate, the tendency to break is greatly alleviated when the plate is bonded at a plurality of discrete points as herein described.

Apart from the items of equipment described, the invention is also suitable for bonding similar items to glass, such as handles, locks (catches, or key-operated cylinder locks), brake lights or spoilers. Such items may weigh at least 500 g, possibly at least 1000 g, and so a high-strength structural bonding system as herein described is required to ensure in-service reliability of the bond. All these items may be bonded directly to a glass sheet, or via an intermediate mounting plate.

What is claimed is:

1. A glazing comprising a glass sheet with a rigid plate bonded to it by a structural adhesive, the rigid plate having at least one surface which corresponds in shape of curvature substantially to the shape of part of a surface of the glass sheet, said surfaces of the glass sheet and the rigid plate each comprising a plurality of discrete areas, wherein the coefficients of thermal expansion of the plate and the glass sheet are different, and the adhesive is provided on at least two discrete areas of one surface of the plate or glass sheet.

2. A glazing as claimed in claim 1, wherein the areas of adhesive are on opposite sides of the overall centre of gravity of the member together with any item attached to the rigid plate.

3. A glazing as claimed in claim 1, wherein a maximum dimension of the rigid plate is at least 70 mm.

4. A glazing as claimed in claim 1, wherein the weight of the rigid plate together with any item attached thereto is at least 500 g.

5. A glazing comprising a glass sheet with a rigid member bonded to it by adhesive, the glass sheet and the rigid member each comprising a plurality of discrete areas, the adhesive being provided on at least two discrete areas of the member or glass sheet, and wherein the member is a mounting plate for a wiper assembly including a wiper drive motor.

6. A glazing comprising a glass sheet with a rigid member bonded to it by adhesive, the glass sheet and the rigid member each comprising a plurality of discrete areas, the adhesive being provided on at least two discrete areas of the member or glass sheet, and wherein the glazing is pivotally mounted so as to be openable, and the member is a mounting plate for a support strut which supports the glazing in the open position.

7. A glazing as claimed in claim 1, wherein the adhesive comprises a polyester/isocyanate mixture, provided in the form of at least two tack-free, heat-activated tablets.

8. A glazing as claimed in claim 7, wherein the rigid plate includes recesses adapted to receive the tablets.

9. A glazing as claimed in claim 1, wherein the adhesive includes a plurality of small inert incompressible beads, the diameter of which corresponds approximately to the desired final thickness of adhesive after bonding.

10. A glazing as claimed in claim 1, wherein the curing time of the adhesive is less than 4 hours.

11. A glazing as claimed in claim 1, wherein a maximum dimension of the plate is at least 100 mm.

12. A glazing as claimed in claim 1, wherein a maximum dimension of the plate is at least 150 mm.

13. A glazing as claimed in claim 1, wherein the weight of the rigid plate together with any item attached thereto is at least 1000 g.

14. A glazing as claimed in claim 1, wherein the curing time of the adhesive is less than 2 hours.

15. A glazing as claimed in claim 1, wherein the curing time of the adhesive is less than 1 hour.

* * * * *